United States Patent Office 3,775,425
Patented Nov. 27, 1973

3,775,425
2-AMINO-4-PHENYL-THIAZOLES AND THEIR ADDITION SALTS
Rene Bosshard, Birsfelden, Switzerland, Jean-Claude Muller, Saint Louis, France, and Edith Ebert, Lorrach, Germany, assignors to Ciba-Geigy Corporation, Ardsley, N.Y.
No Drawing. Filed June 22, 1971, Ser. No. 155,622
Claims priority, application Switzerland, June 23, 1970, 9,478/70
Int. Cl. C07d 91/34
U.S. Cl. 260—306.8 R     5 Claims

ABSTRACT OF THE DISCLOSURE

New 2-amino-4-phenyl-thiazoles and their addition salts of the formula

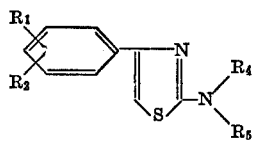

wherein $R_1$ is halogen, lower alkyl or hydroxy
$R_2$ is hydrogen, halogen, lower alky, nitro, hydroxy or phenyl
$R_3$ is hydrogen or halogen
$R_4$ and
$R_5$ are lower alkyl and process for their production are described. These thiazoles and their salts are excellent growth control agents for a great variety of plants. They can be used as herbicides, fertilizers, plant hormones as well as for increasing the sugar content in cane sugar.

---

The present invention relates to new 2-amino-4-phenyl-thiazoles and their addition salts with inorganic or organic acids, to processes for the production of the new thiazoles and their salts, to agents and methods for the control of plant growth and for the increasing of the sugar content in cane sugar by the use of the new thiazoles and their addition salts. The new 2-amino-4-phenyl-thiazoles correspond to Formula I:

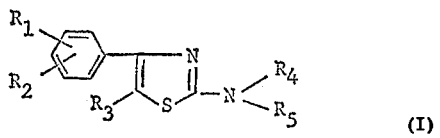

wherein $R_1$ represents halogen, a lower alkyl radical, or the hydroxy radical
$R_2$ represents hydrogen, halogen, a lower alkyl radical or the nitro-, hydroxy- or phenyl radical
$R_3$ represents hydrogen or halogen
$R_4$ and $R_5$ each represent a lower alkyl radical.

By the term "a lower alkyl radical," denoted by the symbols $R_1$, $R_2$, $R_4$ and $R_5$, are meant straight-chain or branched radicals having 1–5 carbon atoms, such as, e.g. methyl, ethyl, n-propyl, isopropy, n-butyl, sec.butyl, isobutyl, tert.butyl and pentyl, of which are preferred for $R_1$ and $R_2$ the methyl and the ethyl radical. Examples of halogen are fluorine, chlorine and bromine.

The new 2-amino-4-phenyl-thiazoles of Formula I are obtained according to the present invention by reacting
(a) A 2-halogen-4-phenyl-thiazole of Formula II:

with an amine of Formula III:

(b) A ω-halogen acetophenone of Formula IV:

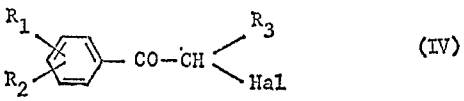

with a thiourea of Formula V:

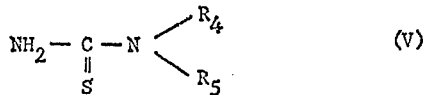

In the Formulae II to V, the symbols $R_1$ to $R_5$ have the meanings given under Formula I; Hal in Formulae II and IV stands for chlorine or bromine.

The processes according to the invention are preferably carried out in the presence of a solvent or diluent inert to the reactants. Suitable for this purpose are, in particular, alkanols such as methanol, ethanol, propanols, etc., also ketones, N,N-dialkylated amides, ethers and ethereal compounds, aliphatic and aromatic hydrocarbons, and halogenated hydrocarbons. The reaction temperatures are in the range of 50–200°, preferably between 50 and 150°. These reaction temperatures govern to a great extent the choice of the solvent or diluent. For the attainment of optimum yields, it is advisable to perform the reaction (a) under pressure. It can moreover be necessary in some cases for the reactions to be carried out in the presence of an acid-binding agent. Suitable for this purpose are, besides the amine component of Formula III used in molar excess, tertiary amines such as trialkylamines, pyridine and pyridine bases, also hydroxides and carbonates of alkali metals and alkaline-earth metals.

The addition salts of the new phenyl-thiazoles are produced by the reaction of a phenylthiazole of Formula I, in a manner known per se, with an inorganic or organic acid. Suitable acids are the following: hydrohalic acids such as hydrochloric acid, hydrobromic acid, phosphoric acid, sulphuric acid, fluoboric acid (HBF$_4$), perchloric acid, alkylsulphuric acid such as methyl or ethylsulphuric acid, naphthoic acids, benzoic acid, halogenbenzoic acids, acetic acid, halogenacetic acid such as trichloroacetic acid, aminoacetic acid, propionic acid, halogenpropionic acids, butyric acid, lactic acid, stearic acid, aliphatic dicarboxylic acids such as oxalic acid, tartaric acid, maleic acid, etc.

The following examples illustrate the production of the new thiazoles. Further thiazoles of Formula I, which have been produced by the process described in the examples, are listed in the following table. The temperatures are given in degrees centigrade.

EXAMPLE 1

(a) 17 g. of 2-chloro-4-(4'-chlorophenyl)-thiazole, 100 ml. of dimethylamine (33% alcoholic solution) and 50 ml. of absolute ethanol are heated in an autoclave for 4 hours to 110°. To the residue, after concentration by evaporation, are added 50 ml. of water, and to the mixture, cooled with ice, are added 100 ml. of concentrated sodium carbonate solution. The suspension is extracted with ether. After concentration by evaporation of the ether solution are obtained 15.8 g. of crude product which yields, after recrystallisation from ethanol (+3% active charcoal) and a second recrystallisation from petroleum ether: 10.5 g. of 2-dimethylamino-4-(4'-chlorophenyl)-thiazole, M.P. 61°–62.5°.

(b) An amount of 41 g. of 2-dimethylamino14-(4'-chlorophenyl)-thiazole is dissolved in 300 ml. of absolute ethanol; the solution is cooled to 15°–20°, and to the solution are then added 39 ml. of 4.5 N ethereal hydrochloric acid and 150 ml. of ether. The hydrochloride precipitates; it is filtered off after a certain time, washed with ether and dried. After processing of the mother liquor are obtained 42.4 g. of 2-dimethylamino-4-(4'-chlorophenyl)-thiazole hydrochloride, M.P. 202–204°, with decomposition.

(c) A cold solution of 3.4 g. of trichloroacetic acid (0.02 M) in 15 ml. of absolute ether and a cold solution of 2.4 g. of 2-dimethylamino-4-(4'-chlorophenyl)-thiazole (0.01 M) in 15 ml. of absolute ether are combined, and to the combined solutions are added 10 ml. of petroleum ether. The crystallisate is filtered off, washed and dried. After processing of the mother liquor are obtained 5.4 g. of 2-dimethylamino-4-(4'-chlorophenyl)-thiazole-di-trichloroacetate, M.P. 112°, with decomposition.

EXAMPLE 2

To 23.3 g. of ω-bromo-4-chloroacetophenone and 10.1 g. of triethylamine in 100 ml. of absolute ethanol are slowly added 10.4 g. of N,N-dimethylthiourea, and the solution is refluxed for one hour. After cooling, the crystals are filtered off, washed with water, and dried. After processing of the mother liquor are obtained 21.1 g. of 2-dimethylamino - 4 - (4'-chlorophenyl) - thioazole, M.P. 63–64°.

| Compounds | Melting point or boiling point |
| --- | --- |
| 2-dimethylamino-4-(3'-chlorophenyl)-thiazole | 49.5–50 |
| 2-dimethylamino-4-(3'-chlorophenyl)-thiazole hydrochloride | 148–150 |
| 2-diethylamino-4-(3'-chlorophenyl)-thiazole | [1] 131–132.5 |
| 2-diethylamino-4-(3'-chlorophenyl)-thiazole methylsulfate | 107–109 |
| 2-diethylamino-4-(3'-chlorophenyl)-thiazole ethylsulfate | 87–91.5 |
| 2-dimethylamino-4-(4'-chlorophenyl)-thiazole | 61–62.5 |
| 2-dimethylamino-4-(4'-chlorophenyl)-thiazole methylsulfate | 178–179.5 |
| 2-dimethylamino-4-(4'-chlorophenyl)-thiazole ethylsulfate | 126–127 |
| 2-dimethylamino-4-(4'-chlorophenyl)-thiazole hydrochloride | 202–204 |
| 2-dimethylamino-4-(4'-chlorophenyl)-thiazole methanesulphonate | 172–174 |
| 2-dimethylamino-4-(4'-chlorophenyl)-thiazole trifluoroacetate | 90–91 |
| 2-dimethylamino-4-(4'-chlorophenyl)-thiazole fluoborate | 194.5–195.5 |
| 2-dimethylamino-4-(4'-chlorophenyl)-thiazole di-trichloracetate | [2] 112 |
| 2-dimethylamino-4-(4'-chlorophenyl)-5-bromo-thiazole | 110 |
| 2-diethylamino-4-(4'-chlorophenyl)-thiazole | [1] 132–134 |
| 2-dimethylamino-4-(3',4'-dichlorophenyl)-thiazole | 92–93.5 |
| 2-dimethylamino-4-(3',4'-dichlorophenyl)-thiazole-ethylsulphate | 144–146 |
| 2-dimethylamino-4-(3',4'-dichlorophenyl)-thiazole hydrochloride | [2] 184.5–192.5 |
| 2-dimethylamino-4-(3',4'-dichlorophenyl)-5-bromothiazole | 123 |
| 2-diethylamino-4-(3',4'-dichlorophenyl)-thiazole-methylsulphate | 130–132 |
| 2-dimethylamino-4-(2',4'-dichlorophenyl)-thiazole | 55.5–56.5 |
| 2-dimethylamino-4-(2',4'-dichlorophenyl)-thiazole hydrochloride | 170.5–173 |
| 2-dimethylamino-4-(2'-chloro-4'-methylphenyl)-thiazole | 47.5–48.5 |
| 2-dimethylamino-4-(2'-chloro-4'-methylphenyl)-thiazole-methylsulphate | 134–137 |
| 2-dimethylamino-4-(2'-chloro-4'-methylphenyl)-thiazole-ethylsulphate | 114–116 |
| 2-dimethylamino-4-(2'-chloro-4'-methylphenyl)-thiazole hydrochloride | 206–208 |
| 2-dimethylamino-4-(4'-chloro-3'-methylphenyl)-thiazole | 66–67.5 |
| 2-dimethylamino-4-(4'-chloro-3'-methylphenyl)-thiazole-ethylsulphate | [1] 140–143 |
| 2-dimethylamino-4-(4'-chloro-3'-methylphenyl)-thiazole hydrochloride | 175–177 |
| 2-dimethylamino-4-phenyl-thiazole hydrochloride | 172–175 |
| 2-dimethylamino-4-phenyl-thiazole fluoborate | 142–144 |
| 2-dimethylamino-4-phenyl-thiazole methane sulfonate | 185–187 |
| 2-dimethylamino-4-phenyl-thiazole di trichloroacetate | 109–111 |
| 2-dimethylamino-4-phenyl-thiazole methylsulfate | 156–158 |
| 2-dimethylamino-4-phenyl-thiazole ethylsulfate | 123–125 |
| 2-dimethylamino-4-(4'-biphenyl)-thiazole | 137–139 |
| 2-dimethylamino-4-(3'-nitro-4'-methylphenyl)-5-bromo-thiazole | 130–133 |
| 2-dimethylamino-4-(4'-hydroxyphenyl)-thiazole | 162–163 |
| 2-dimethylamino-4-(3',4'-dihydroxyphenyl)-thiazole hydrochloride | 190–192 |

[1] At 0.001 torr.
[2] Decomposition.

The new phenylthiazoles of Formula I and their addition salts with acids are excellent growth-control agents for the most diverse varieties of plants. These active substances promote in a varying manner the growth of parts of plants above and below the ground, are not phytotoxic when applied in the usual concentrations, and produce no morphological changes or damage which would result in the withering of the plants. Furthermore, the compounds are not mutagenic. Their action is different from that of a herbicidal active substance, a fertiliser, and a plant hormone.

The active substances according to the invention are distinguished, in particular, in that they effect an increase of nutrient storage in vegetative parts of plants. Of special importance are the phenylthiazoles of Formula I and their salts for the treatment of sugar cane, where they bring about an increase of the sugar content with improved ripening. Moreover, they promote rooting, the formation of tubers, the development of strong stalk material, and intensified branching, etc.

Some effect also an increase of fruit setting, and an acceleration of the ripening process, combined with an increase in crop yield. Others reduce growth in height in the case of various grasses, e.g. lawn grasses, varieties of millet, etc.

The degree of effectiveness depends, amongst other things, on the time and manner of application, as well as on the amounts applied. These three factors vary, however, depending on the type of plant and on the desired effect. Thus, for example, lawns will be treated during the whole of the growth period; decorative plants, of which, for example, the intensity and number of blossoms are to be increased, before the formation of blossom setting; and plants of which the fruit is to be used or sold will be treated immediately after blossoming, or at an appropriate interval before picking.

The active substances are applied in the form of solid and liquid agents both to the plants and into or onto the soil. For application onto the plants, aqueous solutions or dispersions are most suitable. For the treatment of the soil it is possible to use dusts, granulates, scattering agents, and also aqueous solutions or dispersions.

For the widening of the sphere of action, these agents can contain other growth-control agents, e.g. from the range of phosphorus esters.

The following tests illustrate the effect of the active substances according to the invention on the vegetative storage organs of various plants:

(1) Application to sugar cane

In the case of each active substance, fifteen 21 to 24 month old sugar cane plants are treated with an aqueous or acetonic solution of the active substance. The solution is applied into the leaf-spindles of the plants; 38 mg. of active substance are applied to each plant. This amount corresponds to an applied concentration of 3.5 kg. per hectare. The plants are gathered after 4 or 5 weeks. In order to establish the effectiveness of the active substance, the purity of the pressed-out juice with regard to sugar content compared with other organic constituents is determined by the so-called press-method developed by T. Tanimoto (cp. Hawaiian Planters' Record, vol. 57, page 133, 1964). The sugar content is also measured polarimetrically. In the following tables are given the values obtained in these tests. Serving as a reference basis are the values obtained in the case of fifteen untreated plants (control), whereby the numerical value 0 denotes 100%.

TABLE 1

| Active substance | Gathered after 4 weeks, percent | |
|---|---|---|
| | Sugar content (polarimeter) | Purity of the pressed out juice |
| 2-dimethylamino-4-(4'-chlorophenyl)-thiazole hydrochloride | +17.7 | +5.5 |
| 2-dimethylamino-4-(4'-chlorophenyl)-thiazole | +40.9 | +20.3 |
| 2-dimethylamino-4-(2',4'-dichlorophenyl)-thiazole | +36.3 | +16.9 |
| 2-dimethylamino-4-(4'-chlorophenyl)-thiazole-methylsulphate | +16.7 | +7.6 |
| 2-dimethylamino-4-(2'-chloro-4'-methylphenyl)-thiazole-ethylsulphate | +19.2 | +7.6 |
| 2-dimethylamino-4-(2'-chloro-4'-methylphenyl)-thiazole-methylsulphate | +49.2 | +22.4 |
| Control | 0 | 0 |

TABLE 1

| Active substance | Gathered after 4 weeks, percent | |
|---|---|---|
| | Sugar content (polarimeter) | Purity of the pressed out juice |
| 2-dimethylamino-4-(4'-chlorophenyl)-thiazole | +34.5 | +14.4 |
| 2-dimethylamino-4-(3',4'-dichlorophenyl)-thiazole | +17.9 | +10.4 |
| 2-dimethylamino-4-(2'-chloro-4'-methylphenyl)-thiazole.ethylsulphate | +54.3 | +23.6 |
| 2-dimethylamino-4-(2'-chloro-4'-methylphenyl)-thiazole-methylsulphate | +40.7 | +16.3 |
| Control | 0 | 0 |

As a comparison was used the dimethylammonium salt of 2,3,6 - trichlorobenzoic acid, known under the trade name of "Trysben"® (cp. U.S.-Pat. No. 3,245,775). It gave the following values:

| Gathered after 4 weeks, percent | | Gathered after 5 weeks, percent | |
|---|---|---|---|
| Sugar content (polarimeter) | Purity of the pressed out juice | Sugar content (polarimeter) | Purity of the pressed out juice |
| +18.7 | +4.8 | +19.49 | +4.28 |

(2) Application to sorghum spp.

Sorghum plants in the 3-leaf stage are sprayed with aqueous or aqueous-acetonic 0.5% active substance solutions until dripping wet, and subsequently held in a controlled atmosphere chamber at 25°, 65% relative humidity under 15,000 lux. After 28 days, the reduction in the growth in height of the plants is determined by measurement of the internode spacings.

In the following table is given the growth reduction in percent produced by the active substances.

100%=growth in height of the untreated cultivated plants.

| Active substance | Percent growth reduction |
|---|---|
| 2-dimethylamino-4-(3'-chlorophenyl)-thiazole hydrochloride | 50 |
| 2-dimethylamino-4-(4'-chloro-3'-methylphenyl)-thiazole hydrochloride | 50 |
| 2-dimethylamino-4-(4'-chlorophenyl)-thiazole fluoborate | 50 |
| 2-dimethylamino-4-(4'-chlorophenyl)-thiazole methanesulphonate | 30 |
| 2-dimethylamino-4-(4'-chlorophenyl)-thiazole trifluoroacetate | 30 |
| 2-dimethylamino-4-(4'-chlorophenyl)-thiazole ethylsulphate | 30 |

(3) Application to grasses

A lawn-grass mixture consisting of *Lolium perenne* (20%), *Poa pratensis* (23%), *Agrostis tenuis* (10%) and *Festuca rubra* (47%) is cultivated for 4 months in seed trays, and the grass cut once each week. The freshly cut lawn-grass about 1.5 cm. in height is then treated with aqueous or aqueous-acetonic active substance solutions. The lawn-grass is subsequently maintained at 25°, 65% relative humidity under 15,000 lux. The growth in height is assessed 4 weeks after application of the active substances.

In the following table is given the reduction of the growth in height produced by the active substance in the case of different applied amounts.

| Active substance | Reduction in growth in height in percent at— | |
|---|---|---|
| | 10 kg./ha. | 5 kg./ha. |
| 2-dimethylamino-4-(4'-chloro-3'-methylphenyl)-thiazole | 25 | 10 |

NOTE.—100%=Untreated lawn-grass.

Herbicidal agents according to the invention are produced in a manner known per se by the intimate mixing and grinding of active substances of the General Formula I with suitable carriers, optionally with the addition of dispersing agents or solvents which are inert to the active substances. The active substances can be obtained and used in the following forms:

solid preparations: dusts, scattering agents, granules (coated granulates, impregnated granulates and homogeneous granulates);
water-dispersible concentrates of the active substance: wettable powders, pastes, emulsions;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphates, ammonium nitrate, urea, ground vegetable products such as bran, bark dust, sawdust, ground nutshells, cellulose powder, residues of plant extractions, active charcoal, etc., alone or in admixture with each other.

The particles size of the carriers is for dusts advantageously up to about 0.1 mm.; for scattering agents from about 0.075 mm. to 0.2 mm.; and for granulates 0.2 mm. or coarser.

The concentrations of active substance in the solid preparation forms are from 0.5 to 80%.

To these mixtures may also be added additives stabilising the active substance, and/or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, ligninsulphonic acids, their alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm., and in the case of pastes not exceeding 0.03 mm. For the preparation of emulsion concentrates and pastes are used dispersing agents such as those mentioned in the preceding paragraphs, organic solvents, and water. Suitable solvents are, e.g. the following: alcohols, benzene, xylenes, toluene, dimethylsulphoxide, and mineral oil fractions boiling in the range of 120 to 350°. The solvents must be practically odorless, non-phytotoxic, inert to the active substances, and not readily inflammable.

Furthermore, the agents according to the invention can be used in the form of solutions. For this purpose, the active substance (or several active substances) is (or are) dissolved in suitable organic solvents, mixtures of solvents, or water. As organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20%.

To the described agents according to the invention may be added other biocidal active substances or agents. For the widening of their sphere of action, the new agents can contain, in addition to the stated compounds of the General Formula I, e.g. in secticides, fungicides, bactericides, fungistatics, bacteriostatics or nematocides. The agents according to the invention may also contain fertilisers, trace elements, etc.

In the following are described preparations of the new active substances of the General Formula I. The term "parts" denotes parts by weight.

Granulate

The following substances are used for the preparation of a 5% granulate:

5 parts of 2-dimethylamino-4-(4'-chlorophenyl)thiazole,
0.25 part of epichlorhydrin,
0.25 part of cetyl polyglycol ether,
3.50 parts of polyethylene glycol,
91 parts of kaolin (particle size 0.3–0.8 mm.).

The active substance is mixed with epichlorhydrin and the mixture dissolved in 6 parts of acetone; to the solution are thereupon added polyethylene glycol and cetyl polyglycol ether. The thus obtained solution is sprayed on to kaolin, and the acetone then evaporated off in vacuo.

Wettable powder

The following constituents are used for the preparation of (a) a 50%, (b) a 25%, and (c) a 10% wettable powder:

(a)

50 parts of 2-dimethylamino-4-(4'-chlorophenyl)-thiazole,
5 parts of sodium dibutylnaphthalene sulphonate,
3 parts of naphthalenesulphonic acid/phenolsulphonic acid/formaldehyde condensate 3:2:1,
20 parts of kaolin,
22 parts of Champagne chalk;

(b)

25 parts of 2-dimethylamino-4-(2'-chloro-4'-methyl-phenyl)-thiazole-methylsulphate,
10 parts of sodium aluminium silicate,
0.6 part of sodium dibutylnaphthylsulphonate,
1.0 part of naphthalenesulphonic acid/formaldehyde condensate 3:2:1,
63.4 parts of kaolin;

(c)

10 parts of 2-dimethylamino-4-(2'-chloro-4'-methyl-phenyl)-thiazole-ethylsulphate,
3 parts of a mixture of the sodium salts of saturated fatty alcohol sulphates,
5 parts of naphthalene sulphonic acid/formaldehyde condensate,
82 parts of kaolin.

The stated active substance is absorbed onto the appropriate carriers (kaolin and chalk), and the whole subsequently mixed and ground. Wettable powders having excellent wettability and suspension properties are thus obtained. From such wettable powders can be obtained, by dilution with water, suspensions of any desired concentration of active substance. Such suspensions are suitable for the treatment of sugar cane.

Paste

The following substances are used for the preparation of a 45% paste:

45 parts of 2-dimethylamino-4-(4'-chlorophenyl)-thiazole,
5 parts of sodium aluminium silicate,
14 parts of cetal polyglycol ether having 8 moles of ethylene oxide,
1 part of oleylpolyglycol ether having 8 moles of ethylene oxide,
2 parts of spindle oil,
10 parts of polyethylene glycol,
23 parts of water.

The active substance is intimately mixed and ground, in suitable devices, with the additives. A paste is thus obtained from which can be produced, by dilution with water, suspensions of a desired concentration. These suspensions are particularly suitable for the treatment of lawns.

Emulsion concentrate

The following ingredients are mixed together for the preparation of a 10% emulsion concentrate:

10 parts of 2-dimethylamino-4-(4'-chlorophenyl)-thiazole,
15 parts of oleylpolyglycol ether having 8 moles of ethylene oxide,
75 parts of isophorone.

This concentrate can be diluted with water to obtain emulsions of suitable concentrations. Such emulsions are suitable, e.g. for application on sugar cane.

What is claimed is:
1. 2-dimethylamino - 4 - (4'-chlorophenyl)-thiazole hydrochloride.
2. 2-dimethylamino - 4 - (4'-chloro-3'-methylphenyl)-thiazole hydrochloride.
3. 2-dimethylamino - 4 - (2'-chloro-4'-methylphenyl)-thiazole hydrochloride.
4. 2-dimethylamino - 4 - (3',4'-dichlorophenyl)-thiazole.
5. 2-dimethylamino - 4 - (2',4' - dichlorophenyl)-thiazole.

References Cited

UNITED STATES PATENTS

| 1,743,083 | 1/1930 | Johnson | 260—302 R |
| 3,499,910 | 3/1970 | Driscoll | 260—306.8 R |

OTHER REFERENCES

Hampel et al.: J. Pragt. Chem., 1968, 38 (5–6), 320–6.

RICHARD J. GALLAGHER, Primary Examiner

U.S. Cl. X.R.

71—86, 90; 260—302 R